3,712,917
PROCESS FOR SEPARATING UNSATURATED FATTY ACIDS
Ryozi Sato, Yokohama, and Yasuyoshi Chino, Tokyo, Japan, assignors to The Japanese Geon Co., Ltd.
No Drawing. Filed July 13, 1970, Ser. No. 54,559
Claims priority, application Japan, July 17, 1969, 44/56,086
Int. Cl. C07c 69/54
U.S. Cl. 260—486 R                    8 Claims

ABSTRACT OF THE DISCLOSURE

A dilute aqueous solution of acrylic or methacrylic acid, containing less than 70 percent by weight of the acid, is esterified in the presence of an alcohol and an esterification catalyst. During the esterification, the solution is contacted with at least two times the weight of the acid of a hardly water-soluble organic solvent mixture. The solvent mixture comprises at least one saturated hydrocarbon and at least one member selected from the group consisting of aromatic hydrocarbons, ethers and ketones. The resulting ester of the acid is thereby transferred to the solvent mixture.

---

The present invention relates to a process for separating acrylic or methacrylic acid. More particularly, the invention pertains to a process for separating acrylic or methacrylic acid from a dilute aqueous acrylic or methacrylic acid solution containing less than 70% by weight of said unsaturated fatty acid, characterized by subjecting the said dilute aqueous solution to esterification reaction in the presence of an alcohol and an esterification catalyst, while contacting the solution with at least 2 times the weight of said unsaturated fatty acid of a hardly water-soluble organic solvent mixture comprising (i) at least one member of saturated hydrocarbons and (ii) at least one member of aromatic hydrocarbons, ethers and ketones, thereby transferring the resulting ester of said unsaturated fatty acid into the organic solvent mixture.

Recently, there have been developed processes for preparing acrylic or methacrylic acid by the oxidation reaction of propylene or acrolein, or isobutene or metacrolein. However, the reaction product obtained according to any of said processes contains, ordinarily, a large amount of water. Accordingly, the separation of acrylic or methacrylic acid from a dilute aqueous acrylic or methacrylic acid solution is directed chiefly to the separation of the acid from the co-existing water. As processes for such separation, there has heretofore been adopted any of distillation, fractionation, extractive distillation, liquid-liquid extraction or combinations thereof. However, all these processes are not satisfactory yet. In the case of the distillation process, for example, the costs of equipments and operations necessary to remove large amounts of water are increased, and the distillation treatment of acrylic or methacrylic acid, which is chemically unstable and which is higher in boiling point than water, is necessarily exposed to a high temperature, with the result that a polymer is liable to be formed to bring about the loss of acrylic or methacrylic acid and the complexity of the operations. The above-mentioned disadvantages may be avoided by carrying out the distillation operation under reduced pressure. Considering the increase in costs of equipments and operations, however, such reduced pressure distillation cannot always be effective to solve the problem in the prior art. The liquid-liquid extraction process is neither satisfactory in that since acrylic or methacrylic acid is easily water-soluble, the type of preferable extraction solvents capable of selectively extracting the acid with high efficiency is limited. Further the said process is not desirable from the economical standpoint if the extraction solvent used is of the less commercial availability, or if an extraction solvent is used in a large amount in order to increase the extraction efficiency. Even though a certain preferable extraction solvent has been obtained and used in the said process, the separation operation of acrylic or methacrylic acid from the extract necessarily accompanies, to a certain extent, such drawbacks as pointed out in the aforesaid distillation process. Further, the separation step of acrylic or methacrylic acid according to the said process is extremely complex and diverse to necessarily bring about the cost increase of equipments and operations, and there are many unsatisfactory points from the industrial and economical standpoints. Thus, the liquid-liquid extraction process cannot always be advantageous.

We made extensive studies to improve the abovementioned processes for separating acrylic or methacrylic acid which have such drawbacks as mentioned above. As the result, we have accomplished the present invention.

An object of the present invention is to provide a process for separating acrylic or methacrylic acid from a dilute aqueous acrylic or methacrylic acid solution, characterized by subjecting the said dilute aqueous solution to esterification reaction with an alcohol in the presence of an esterification catalyst, while contacting the solution with a specific amount of a mixed oragnic solvent comprising such specific combination as mentioned above, thereby transferring the resulting ester of said acrylic or methacrylic acid into the mixed organic solvent phase.

Another object of the invention is to provide a process for separating acrylic or methacrylic acid from a dilute aqueous acrylic or methacrylic acid solution, characterized by subjecting the dilute aqueous solution to the abovementioned esterification reaction to obtain a liquid reaction mixture composed of an aqueous phase and an organic phase comprising the mixed organic solvent and the resulting ester, separating the said organic phase from the reaction liquid and then recovering the ester from the organic phase.

As is well known, the esterification reaction of an organic acid is an equilibrium reaction which forms water. In order to effect the esterification reaction advantageously, therefore, it is necessary to adopt a process in which the reaction is carried out while removing the formed water. As such process, there has been known a process in which the water is removed by heating or azeotropic distillation. As another process, Japanese patent publication No. 13,131/1969 discloses a process for the methyl-esterification of acrylic acid by mixing the acrylic acid with methanol, an esterification catalyst and 0.2 to 1.0 times the weight of said acrylic acid of a hydrocarbon having a boiling point of more than 90° C., and subjecting the mixture to esterification reaction in such a manner that the equilibrium of the reaction is advantageously shifted by utilization of the fact that the water formed by the reaction does not dissolve in the organic phase but forms an aqueous phase while the resulting ester is transferred to the organic phase. However, in the case where a dilute aqueous solution of organic acid is used as it is as the starting material for the esterification, like in the present invention, such a process that the water is removed by mere heating or azeotropic distillation is not only extremely low in reaction rate and yield and induces side reactions including polymerization reaction but also is disadvantageous from the economical standpoint, and hence can by no means be practiced on industrial scale. On the other hand, the process disclosed in Japanese patent publication No. 13,131/1969 is neither suitable for the esterification of a dilute aqueous organic acid solution. For example, if, in the esterification of an aqueous methacrylic acid solution comprising 70% by weight of methacrylic acid and 30% by weight of water, toluene is used in 0.5 times the weight of the methacrylic acid, the yield of methyl methacrylate present in the organic phase is 41.0 mole percent based on the methacrylic acid. Even if the amount of the organic solvent is increased, and n-decane, for example, is used in about 2.0 times the weight of the methacrylic acid, the yield of the ester in the organic phase is not more than 77.2 mole percent. Further, as the concentration of methacrylic acid is made lower than 70% by weight, the rate and yield of the esterification reaction become lower. Thus, in the esterification reaction of a dilute aqueous organic acid solution, in which the concentration of the organic acid is less than 70% by weight, the above-mentioned process cannot give any satisfactory results. In contrast thereto, when the esterification reaction is carried out according to the present process, using as the organic solvent 2.1 times the weight of the methacrylic acid of a mixed solvent comprising xylene and n-decane in a weight ratio of 70:30 (percent), there is obtained such a surprising result that the yield of methyl methacrylate in the organic phase is 92.5 mole percent.

Thus, the present invention is a process for separating acrylic or methacrylic acid by effecting simultaneously the extraction and esterification of acrylic or methacrylic acid. The difference between this process and the conventional processes is that this invention stipulates as essential conditions that a dilute aqueous acrylic or methacrylic acid solution should be used as it is as the starting material, and that a hardly water-soluble mixed organic solvent comprising (i) at least one member of saturated hydrocarbons and (ii) at least one member of aromatic hydrocarbons, ethers and ketones is used in an amount at least 2.0 times the weight of the acrylic or methacrylic acid. In the cases where the said essential conditions are not satisfied, e.g. in the case where the organic solvent (i) or (ii) is used alone, as mentioned previously or as shown in the comparative examples set forth later; in the case where a mixture of ether and ketone is used; or in the case where, even if a mixed solvent comprising the organic solvents (i) and (ii) is used, the amount thereof is less than that stipulated in the present invention, no desired effects of the present invention can be attained.

The reason why the mixed organic solvent comprising the above-mentioned specific combination is particularly effective has not been clairfied yet. However, it is qualitatively inferred that when the saturated hydrocarbon (i), which is relatively low in polarity quite hardly water-soluble, is used in combination with the said organic solvent (ii), which is higher in polarity than said saturated hydrocarbon and which can extract the organic acid from its aqueous solution more easily, in general, than in the case of the saturated hydrocarbon, and when the amount of the resulting mixed organic solvent is suitably controlled, the partition of organic acid, ester, alcohol and water in the reaction system is delicately affected to give favorable results.

Thus, according to the process of the present invention, the esterification reaction using as the starting material a dilute aqueous solution of acrylic or methacrylic acid, which has heretofore been considered difficult, can be effected at a high reaction rate and with advantages. Moreover, there has been attained such an unexpected result that substantially all of the acrylic or methacrylic acid can be transferred into the organic phase. Utilizing the said result, the present invention characteristically brings about, in separating acrylic or methacrylic acid from a dilute aqueous solution thereof, such effects as mentioned below.

(1) Acrylic or methacrylic acid is formed into an ester, which is far lower in water-solubility than the corresponding unsaturated fatty acid, and there can be expected an extraction efficiency higher than in the case where the unsaturated fatty acid itself is extracted.

(2) The boiling point of the ester is lower than that of the corresponding unsaturated fatty acid, so that the operational temperature condition in the case of separating and purifying the ester from the mixed organic solvent (extract or organic phase) containing the ester is milder than in the case of separating and purifying the unsaturated fatty acid from an extract obtained by extracting the acid with an extracting agent from a dilute aqueous solution of the unsaturated fatty acid. As a result, loss of the unsaturated fatty acid and operation troubles caused by the formation of polymer can be avoided.

(3) The residue obtained after recovery of the ester from the extract (organic phase) separated from the aqueous phase after completion of the reaction, i.e. the mixed organic solvent containing unsaturated acrylic or methacrylic acid, can be recycled as it is to the reaction system, as occasion demands.

(4) Ordinarily, acrylic and methacrylic acids are used in the form of esters. According to the present process, the ester of acrylic or methacrylic acid can be obtained by one step, without employing two steps of extraction and esterification, whereby the steps can be simplified.

The dilute aqueous solution used in the present invention may contain acetone, acetic acid and the like materials which are ordinarily by-produced in addition to acrylic or methacrylic acid by the gas phase oxidation reaction of propylene or acrolein, or of isobutene or metacrolein. Even when such by-products are present, the technical effects of the present invention are not decreased.

In accordance with the present process, particularly marked effects can be attained when a dilute aqueous solution containing acrylic or methacrylic acid at a concentration of less than 70% by weight is used as the starting material. The lower the concentration, the greater the effects of the present invention is. Accordingly, the content of acrylic or methacrylic acid in the dilute aqueous solution used in the present process is preferably in the range of 5 to 70% by weight. Even in the case where the content of the acid is lower than said range, the effects of the present invention can be maintained by selecting the operational conditions suitably.

The mixed organic solvent comprising the aforesaid solvents (i) and (ii) needs to have such properties that it is liquid under the esterification reaction conditions; that it is high in solubility for acrylic or methacrylic acid ester, and the hardly water-soluble property thereof is not substantially deteriorated even by the change of circumferential temperatures or the co-existence of any type of materials; and that the boiling point difference between the solvent and the resulting ester is sufficiently great so as to facilitate the distillation and separation of the ester. Accordingly, as the aforesaid saturated hydrocarbons (i), there are used straight-chain or alicyclic saturated hydrocarbons. Particularly, saturated aliphatic hydrocarbons having 7 to 17 carbons are preferable. Of course, mixtures of saturated hydrocarbons different in number of carbon atoms such as light oils may also be used. Among the organic solvents (ii), the aromatic hydrocarbons are preferably benzene, toluene, xylene, ethylbenzene, etc., particularly those having substituents; the ethers are preferably methylphenyl ether, ethylbutyl ether, di-n-propyl ether, di-n-butyl ether, etc.; and the ketones are preferably methylisobutylketone, methylphenylketone, diethylketone, cyclohexanone, etc.

The proportions of the organic solvents (i) and (ii) are not particularly limited. Ordinarily, however, the organic solvent (i) is used in a proportion of more than 20% by weight, preferably 30 to 90% by weight based on the said mixed organic solvent. Further, the amount of the mixed organic solvent used in the present process is at least 2.0 times, preferably 2.0 to 10 times, the weight of the acrylic or methacrylic acid, and is at least 0.5 times, preferably 1 to 5 times, the weight of the dilute aqueous solution containing said unsaturated fatty acid.

The alcohol used in the present process may be any of mono-, di- and tri-hydric alcohols, preferably, however, there is used a monohydric alcohol having 1 to 8 carbon atoms such as methanol, ethanol, n-butanol or 2-ethylhexanol. The alcohol is desirably used in an amount within the range from the stoichiometric amount to such an amount that the hardly water-soluble property of the organic solvent is not deteriorated. Such an amount can easily be determined through simple experiments. Usually, however, the amount of the alcohol is 1.0 to 4.0 times, preferably 1.5 to 3.0 times, the mole of the acrylic or methacrylic acid.

The esterification catalyst used in the present invention may be any of the known esterification catalysts, and is preferably sulfuric acid, phosphoric acid or such an organo-sulfonic acid as p-toluenesulfonic acid or benzenesulfonic acid. The amount of the catalyst used is preferably 0.005 to 0.8 times the weight of the aqueous solution of acrylic or methacrylic acid. Alternatively, a cation-exchange resin may also be used as the esterification catalyst.

The reaction temperature and time are ordinarily 60° to 150° C. and 0.5 to 5 hours, preferably 70° to 130° C. and 1 to 3 hours, respectively.

Even when the aqueous solution is incorporated with such a water-soluble inorganic salt as sodium chloride or sodium sulfate, the reaction can be effected without any trouble. Further, it is desirable to inhibit the formation of a polymer by adding, if necessary, a suitable amount of a polymerization inhibitor such as hydroquinone or the like.

After the esterification reaction, the liquid reaction mixture separates into an organic phase (extract) containing a slight amount of unreacted acrylic or methacrylic acid and substantially all of the resulting ester, and an aqueous phase comprising water and a slight amount of unreacted carylic or methacrylic acid. The two phases are separated from each other, and the organic phase is subjected to ordinary distillation at atmospheric pressure or under reduced pressure to separate the ester of acrylic or methacrylic acid from the extract, followed by purification if necessary. The residue obtained after separation of the ester, i.e. the organic solvent containing unreacted acrylic or methacrylic acid and other materials, is reused either as it is or after treatment.

The present invention is illustrated in further detail below with reference to examples, in which all parts and percentages are by weight unless otherwise specified.

EXAMPLE 1

41 parts of methanol, 31 parts of concentrated sulfuric acid and 0.3 part of hydroquinone were added to 100 parts of a dilute aqueous methacrylic acid solution comprising 55% of methacrylic acid, 32% of water, 7% of acetone and 6% of acetic acid. The resulting mixture was sufficiently contacted with each of the mixed organic solvents set forth in the table below, while maintaining the mixture at 80° C. After 2 hours, the mole percent, based on the fed amount of the methacrylic acid, of the methyl methacrylate present in the organic phase composed mainly of the mixed organic solvent was calculated to obtain the results shown in the following table:

| Run No. | Composition of mixed organic solvent | Percent | Amount of solvent used (parts) | A | B, mole percent |
|---|---|---|---|---|---|
| 1 | Methylphenylether | 40 | 140 | 2.55 | 92.9 |
|  | n-Decane | 60 |  |  |  |
| 2 | Methylisobutylketone | 10 | 167 | 3.04 | 88.2 |
|  | n-Decane | 90 |  |  |  |
| 3 | Xylene (isomer mixture) | 70 | 182 | 3.31 | 95.1 |
|  | n-Decane | 30 |  |  |  |
| 4 | Ethylbenzene | 50 | 132 | 2.40 | 91.0 |
|  | n-Octane | 50 |  |  |  |

NOTE.—A = The amount of the solvent used, represented by the times of the weight of the methacrylic acid feed. B = The mole percent, based on the methacrylic acid feed, of methyl methacrylate in the organic phase. (The same shall apply hereinafter.)

The organic phase obtained in Run No. 3 was separated from the aqueous phase and then distilled to obtain a fraction of 97.1% of methyl methacrylate in a boiling point range of 100° to 104° C.

COMPARATIVE EXAMPLE 1

Example 1 was repeated, except that the kind and amount of the solvent used were varied as shown in the table below. The results were as set forth in the following table:

| Run No. | Solvent | Amount solvent used (parts) | A | B, mole percent |
|---|---|---|---|---|
| 1 | n-Decane | 138 | 2.51 | 70.2 |
| 2 | Light oil | 126 | 2.29 | 66.6 |
| 3 | Xylene (isomer mixture) | 165 | 3.00 | 69.3 |
| 4 | Methylphenylether | 193 | 3.51 | 70.6 |
| 5 | Methylisobutylketone | 154 | 2.80 | 60.0 |
| 6 | Methylphenylether, 70% / Methylisobutylketone, 30% | 170 | 3.09 | 70.6 |

EXAMPLE 2

52 parts of methanol, 21 parts of concentrated sulfuric acid and 0.3 part of hydroquinone were added to a dilute aqueous methacrylic acid solution comprising 70% f methacrylic acid and 30% of water. The resulting mixture was contacted at 80° C. for 2 hours with 150 parts (2.14 times the weight of the methacrylic acid) of a mixed organic solvent comprising 70% of xylene (isomer mixture) and 30% of n-decane to obtain 92.5 mole percent of methyl methacrylate based on the methacrylic acid.

COMPARATIVE EXAMPLE 3

Example 2 was repeated, except that the kind and amount of the solvent used were varied as shown in the table below. The results were as set forth in the following table:

| Run No. | Solvent | Amount solvent used (parts) | A | B, mole percent |
|---|---|---|---|---|
| 1 | Toluene | 35 | 0.50 | 41.0 |
| 2 | n-Decane | 70 | 1.00 | 63.6 |
| 3 | Xylene (isomer mixture) 70% / n-Decane, 30% | 70 | 1.00 | 79.2 |
| 4 | n-Decane | 133 | 1.90 | 77.2 |

EXAMPLE 3

22 parts of methanol, 0.2 part of hydroquinone and 69 parts of concentrated sulfuric acid were added to a dilute aqueous methacrylic acid solution comprising 30% of methacrylic acid and 70% of water. The resulting mixture was contacted at 84° C. for 3 hours with a mixed organic solvent comprising 30% of n-decane and 70% of xylene to obtain 91.6 mole percent of methyl methacrylate, based on the methacrylic acid feed.

COMPARATIVE EXAMPLE 3

Example 3 was repeated, except that 60 parts (2.0 times the weight of the fed methacrylic acid) of n-decane was used as the solvent, to obtain 47.2 mole percent of methyl methacrylate, based on the methacrylic acid feed.

EXAMPLE 4

108 parts of n-butanol, 20 parts of concentrated sulfuric acid and 0.4 part of hydroquinone were added to 100 parts of a dilute aqueous methacrylic acid solution comprising 63% of methacrylic acid and 37% of water. The resulting mixture was contacted at 85° C. for 2.5 hours with 160 parts of the same mixed organic solvent as in Example 2 to obtain 96.5 mole percent of butyl methacrylate, based on the methacrylic acid feed.

EXAMPLE 5

54 parts of ethanol, 50 parts of concentrated sulfuric acid and 0.3 part of hydroquinone were added to 100 parts of a dilute aqueous acrylic acid solution comprising 42% of acrylic acid and 58% of water. The resulting mixture was contacted at 70° C. for 3 hours with 168 parts of the same mixed organic solvent as in Example 2 to obtain 84.4 mole percent of ethyl acrylate, based on the acrylic acid feed.

EXAMPLE 6

47 parts of methanol, 3.1 parts of concentrated sulfuric acid and 0.4 part of hydroquinone were added to 100 parts of a dilute aqueous methacrylic acid solution comprising 63% of methacrylic acid and 37% of water. The resulting mixture was contacted at 110° C. for 3 hours with 182 parts (2.89 times the weight of the methacrylic acid feed) of a mixed organic solvent comprising 70% of xylene and 30% of decane to obtain 96.4 mole percent of methyl methacrylate, based on the methacrylic acid feed.

What is claimed is:

1. A process for separating acrylic or methacrylic acid from a dilute aqueous acrylic or methacrylic acid solution containing less than 70% by weight of said unsaturated fatty acid, characterized by subjecting the said dilute aqueous solution to esterification reaction in the presence of an alcohol and an esterification catalyst, while contacting the solution with at least 2 times the weight of said unsaturated fatty acid of a hardly water-soluble mixed organic solvent comprising (i) at least one member of saturated hydrocarbons and (ii) at least one member of aromatic hydrocarbons, ethers and ketones, thereby transferring the resulting ester of said unsaturated fatty acid into the mixed organic solvent.

2. A process for separating acrylic or methacrylic acid from a dilute aqueous acrylic or methacrylic acid solution containing less than 70% by weight of said unsaturated fatty acid, characterized by subjecting the said dilute aqueous solution to esterification reaction in the presence of an alcohol and an esterification catalyst, while contacting the solution with at least 2 times the weight of said unsaturated fatty acid of a hardly water-soluble mixed organic solvent comprising (i) at least one member of saturated hydrocarbons and (ii) at least one member of aromatic hydrocarbons, ethers and ketones, thereby transferring the resulting ester of said unsaturated fatty acid into the mixed organic solvent to form in the reaction liquid an aqueous phase and an organic phase containing the ester, separating the organic phase from the reaction liquid, and then isolating and recovering the ester from the said organic phase.

3. The process according to claim 1, wherein the saturated hydrocarbons are saturated aliphatic hydrocarbons having 7 to 17 carbon atoms, and the aromatic hydrocarbons are benzene, toluene, xylene, ethyl benzene, or other substituted derivatives thereof, and the ethers are methylphenyl ether, ethylbutyl ether, di-n-propyl ether or di-n-butyl ether, and the ketones are methylisobutylketone, methylphenylketone, diethylketone or cyclohexanone.

4. The process according to claim 1, wherein the said mixed organic solvent comprising (i) light oil and (ii) xylene.

5. The process according to claim 1, wherein the said alcohol is a monohydric alcohol having 1 to 8 carbon atoms.

6. The process according to claim 2, wherein the saturated hydrocarbons are saturated aliphatic hydrocarbons having 7 to 17 carbon atoms, and the aromatic hydrocarbons are benzene, toluene, xylene, ethyl benzene, or other substituted derivatives thereof, and the ethers are methylphenyl ether, ethylbutyl ether, di-n-propyl ether or di-n-butyl ether, and the ketones are methylisobutylketone, methylphenylketone, diethylketone or cyclohexanone.

7. The process according to claim 2, wherein the said mixed organic solvent comprises (i) light oil and (ii) xylene.

8. The process according to claim 2, wherein the said alcohol is monohydric alcohol having 1 to 8 carbon atoms.

References Cited

UNITED STATES PATENTS 2,911,420   11/1959   Brown _____ 260—486 R

FOREIGN PATENTS 851,342   5/1959   Great Britain _____ 260—486 R

HENRY R. JILES, Primary Examiner

P. J. KILLOS, Assistant Examiner